United States Patent
Lee

(10) Patent No.: US 6,393,003 B1
(45) Date of Patent: May 21, 2002

(54) SEMI-SOFT HANDOFF METHOD THAT USES MULTIPLE COMMON FREQUENCY

(75) Inventor: Kwang-Wook Lee, Hanam (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/135,310

(22) Filed: Aug. 17, 1998

(30) Foreign Application Priority Data

Aug. 22, 1997 (KR) ............................................. 97-40042

(51) Int. Cl.⁷ .......................... H04B 7/216; H04Q 7/00
(52) U.S. Cl. ...................... 370/331; 370/342; 455/436; 455/442
(58) Field of Search ................................. 455/436, 442, 455/453, 525, 458, 438, 443, 450; 370/331, 332, 333, 335, 342, 334

(56) References Cited

U.S. PATENT DOCUMENTS

| | | | | |
|---|---|---|---|---|
| 5,734,984 A | * | 3/1998 | Reece et al. ................. | 455/458 |
| 5,737,705 A | * | 4/1998 | Ruppel et al. ............... | 455/452 |
| 5,790,528 A | * | 8/1998 | Muszynski .................. | 370/331 |
| 5,930,714 A | * | 7/1999 | Abu-Amara et al. ......... | 455/442 |
| 5,953,668 A | * | 9/1999 | Reilly ......................... | 455/454 |
| 6,026,301 A | * | 2/2000 | Satarasinghe ............... | 455/436 |

\* cited by examiner

*Primary Examiner*—Alpus H. Hsu
*Assistant Examiner*—Afsar M. Qureshi
(74) *Attorney, Agent, or Firm*—Dilworth & Barrese, LLP

(57) ABSTRACT

A semi-soft handoff method, in accordance with the present invention is described. In the instance a base station makes use of multiple frequency channel, a mobile station moves inter-cell and service on a frequency that processes the present call within the destination cell to be moved to is not offered, to guarantee the call's continuance, the base station examines all adjacent cells' frequency assignment conditions and sets all cells' multiple common frequencies. Furthermore, the base station manages the traffic within a common frequency selected from the multiple common frequencies. After receiving a handoff requirement message, the base station examines for the common frequency with a minimum load. Next, the base station executes an inter-cell inter-frequency hard handoff to the corresponding common frequency and soft handoff to the destination cell by using the common frequency.

23 Claims, 2 Drawing Sheets

BSC #1

SEMI-SOFT HANDOFF METHOD THAT USES MULTIPLE COMMON FREQUENCY

FIELD OF THE INVENTION

This invention relates to a semi-soft handoff method and system that uses multiple common frequencies, and more particularly, to a system and method of executing inter-cell inter-frequency assignments with semi-soft handoffs in mobile communication systems employing Code Division Multiple Access (CDMA).

DESCRIPTION OF THE RELATED ART

A Personal Communications Services (PCS) and/or CDMA cellular system typically include a Base station Transceiver Subsystem (BTS), a Base Station Controller (BSC), a Base Station Manager System that manages the operation of many BSC's, a Switching system and a Location Registration System. Each base station transceiver subsystem usually manages one cell.

When a wireless telephone (mobile station or unit) moves to various areas, communication transmission difficulties should be minimized, and when the mobile station is idle, the mobile station must regularly re-register according to various parameters. When a call is in progress, the mobile station, the base station and the switching station manage the communication between the mobile station and the base station to maintain an acceptable radio link efficiency.

In a CDMA and wide-band CDMA system, one mobile station can simultaneously receive signals from more than two base stations. Therefore, the CDMA and the wide-band CDMA system can process a handoff from one base station to another base station or from one antenna area to another area within one base station.

As for the CDMA cellular and the PCS system, to guarantee the call's continuance, various forms of handoffs are offered. These various forms of handoffs can have efficiency differences with respect to their reliability regarding a call's continuance and the system load which follows from the method of handoff and from the contents of the call.

As is known to those skilled in the art, the handoff method is classified into mainly soft handoffs and hard handoffs. Soft handoffs are classified into inter-cell soft handoffs, inter-BSC soft handoffs and inter-sector soft handoffs. In particular, the inter-sector handoff is often called softer handoff. Hard handoffs are classified into inter-MSC (mobile station switching center) hard handoffs, inter-frequency assignment hard handoffs and inter-frame offset hard handoffs.

In addition, there is an inter-cell inter-frequency handoff in the CDMA network which is employed when the serviceable frequency channel's number does not accord with adjacent cells. With respect to this type of system, the inter-cell inter-frequency handoff is categorized into an inter-cell inter-frequency hard handoff that uses a pilot generator and a semi-soft handoff that uses a common frequency.

Although the inter-cell inter-frequency hard handoff, which uses the pilot generator, requires inter-cell handoff, it is also a method of directly transferring to another frequency within a destination cell in the case where the frequency executing the present call cannot receive the service within the destination cell to be moved to. For additional hardware, like the pilot generator, etc. that must be setup in the system, space is needed within the system and must be provided with the necessary power and signal/power etc. interface(s). Furthermore, for one pilot generator, there is a need for a channel card, a sector interface card, a transceiver module and a high power amplifier etc. If the pilot generator were miniaturized for use in external equipment, it would become much more difficult to provide an interface between the external pilot generator and the inter-cell system's interface. In this case, to combine the pilot generator's final output to the system's output, additional modules like RF power couplers, etc. are needed. Because these additional modules add expense to the entire system, a system redesign considering such changes is required. To compensate for the additional power loss, the system output level must also be increased. Limitations in the performance and in the development of a miniaturized mobile system are brought about by these problems.

The Semi-Soft Handoff, which uses a common frequency, processes the handoff by software means. It uses a primary channel with the common frequency when the adjacent inter-cell frequency assignment is different. However, unlike the inter-cell inter-frequency hard handoff which uses the pilot generator to verify the presence of an adjacent base station, the semi-soft handoff method determines the handoff point based only on the weakening of the present cell's pilot signal power. However, because the handoff method does not require additional hardware, it is beneficial with regard to system price, use of space and facility maintenance repairs.

With a semi-soft handoff method, because the inter-frequency hard handoff within the cell occurs toward the common frequency, the decisive parameter required for the handoff is the amount of the common frequency's load. If the amount of the common frequency's load is excessive, additional requests for inter-frequency hard handoffs within the cell cannot be processed. Also, the assignment of a new call to the common frequency and a soft handoff from the adjacent base station cannot be processed. Therefore, whether the common frequency will be overloaded can be known by comparing the hard handoff call's load occurring within the cell and the common frequency processing function amount for the entire call processing system.

Therefore, a need exists for an improved handoff method which employs multiple common frequencies to address problems occurring due to common frequency overload.

SUMMARY OF THE INVENTION

The present invention was devised to solve problems in the semi-soft handoff method. The object of the invention is to offer a semi-soft handoff method that uses multiple common frequencies.

To achieve the above objective, according to the invention, there is provided a semi-soft handoff method, using multiple common frequencies. A base station makes use of a multiple frequency channel. When a mobile station moves inter-cell, and the service on the frequency that processes a present sector within a destination cell to be moved to is not offered, to guarantee the call's continuance, the base station examines all adjacent cells' frequency assignment conditions and detects frequencies that all cells have commonly and designates the detected frequencies as all cells' common frequency. The traffic is managed within the common frequency. When a handoff request message is received to a base station, the base station detects a common frequency with a lowest load among the common frequencies. The base station executes an intra-cell inter-frequency hard handoff to the common frequency with the lowest load, and an inter-cell soft handoff to the destination cell by using the common frequency. An inter-cell inter-frequency hard handoff is executed to a corresponding common frequency. A soft handoff is executed to the destination cell by using the common frequency determined by the examination of minimum load.

In the present invention, it is preferable that each base station individually executes inter-cell inter-frequency handoffs using multiple common frequencies, that the inter-cell inter-frequency handoff is determined based on the power of the pilot signal receiving the present service when the hard handoff is executed. It is also preferable that the number of the common frequencies is set at the lowest among frequencies assigned to each cell. When a common frequency is overloaded, calls of the overloaded common frequency move to another frequency by forcing a hard handoff. It is further preferable that the base station designates a paging channel of an idle mobile station within the common frequency as a noncommon frequency so as to avoid new traffic from being assigned to the common frequency. When the idle mobile station tries to form a traffic channel, the base station assigns traffic for the mobile station to a traffic channel in the noncommon frequency. The base station manages the load of traffic for each common frequency for traffic uniformity. Accordingly, the base station assigns traffic from new calls to a common frequency with the lowest traffic load. A function is provided to set up a call by assigning the traffic channel to a different frequency, not to the corresponding mobile station's frequency range when setting a new call. The sector is set to another frequency by designating a CDMA frequency's description to an applicable frequency, which is among the descriptions of the paging channel CDMA assigned messages.

In one preferred mode, in accordance with the present invention, the semi-soft handoff method, in the instance a base station makes use of multiple frequency channel, a mobile station moves inter-cell and service on a frequency that processes the present call within the destination cell to be moved to is not offered, to guarantee the call's continuance, the base station examines all adjacent cells' frequency assignment conditions and detects frequencies that all cells have commonly and designates the detected frequencies as all cells' common frequency. Furthermore, the base station manages the traffic within the multiple common frequencies. After receiving a handoff request message, the base station detects a common frequency with a minimum load among the common frequencies. The base station executes an intra-cell inter-frequency hard handoff to the common frequency with the lowest load and an inter-cell soft handoff to the destination cell by using the common frequency. Next, the base station executes an inter-cell inter-frequency hard handoff to the corresponding common frequency and soft handoff to the destination cell by using the common frequency.

BRIEF DESCRIPTION OF THE DRAWINGS

Other objects and advantages of the invention will become apparent upon reading the following detailed description and with reference to the drawings in which.

Figure 1:
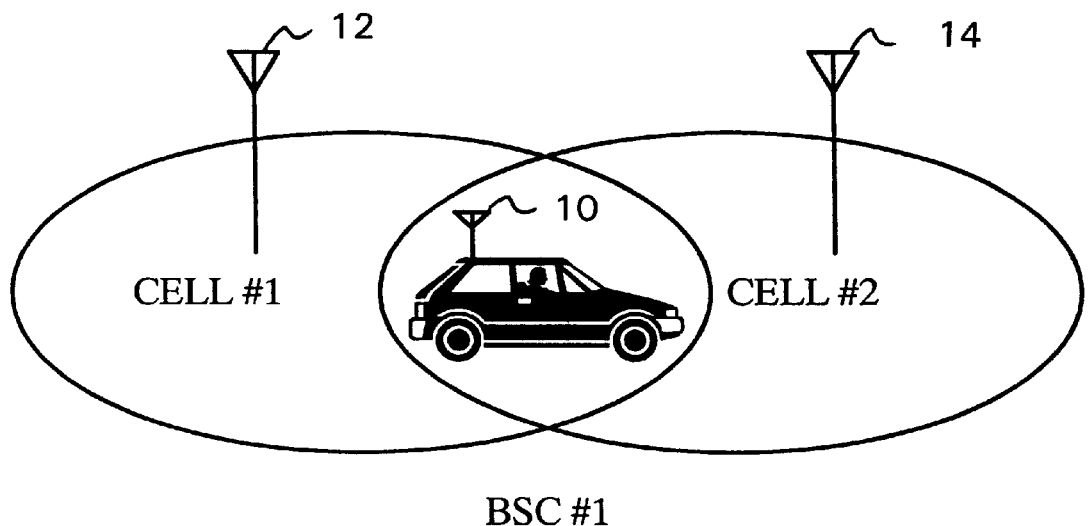
FIG. 1 illustrates an inter-cell soft handoff.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF PREFERRED EMBODIMENTS

A semi-soft handoff method and system which uses multiple common frequency is described. The invention executes inter-frequency hard handoffs within a cell for inter-cell inter-frequency handoffs. In one important aspect of the invention, the use of multiple common frequencies is employed to reduce overloading of the common frequency. Different from the prior art, which used only an initial FA1 channel as the common frequency, the invention checks multiple cell frequency assignment conditions and uses as the common frequency in each cell, the frequency which has the number of the lowest frequency assignments.

Referring to FIG. 1, a mobile station 10 is shown moving between cell #1 and cell #2 (destination cell). Each cell is maintained by a base station 12 and 14. When mobile station 10 reaches the destination cell a handoff occurs and service is provided by cell #2 instead of cell #1.

Figure 2:
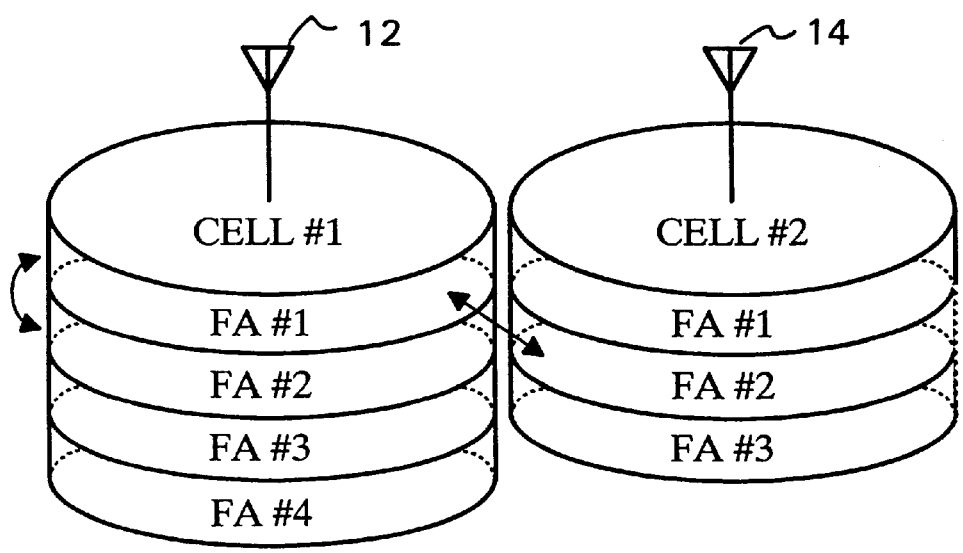
FIG. 2 is a schematic illustrating an inter-frequency hard handoff.

Referring to FIG. 2, each cell operates at a common frequency. In accordance with the present invention multiple common frequencies (on channels FA) are provided such that handoff is more efficiently performed and overload of a given frequency channel is less likely.

Figure 3:
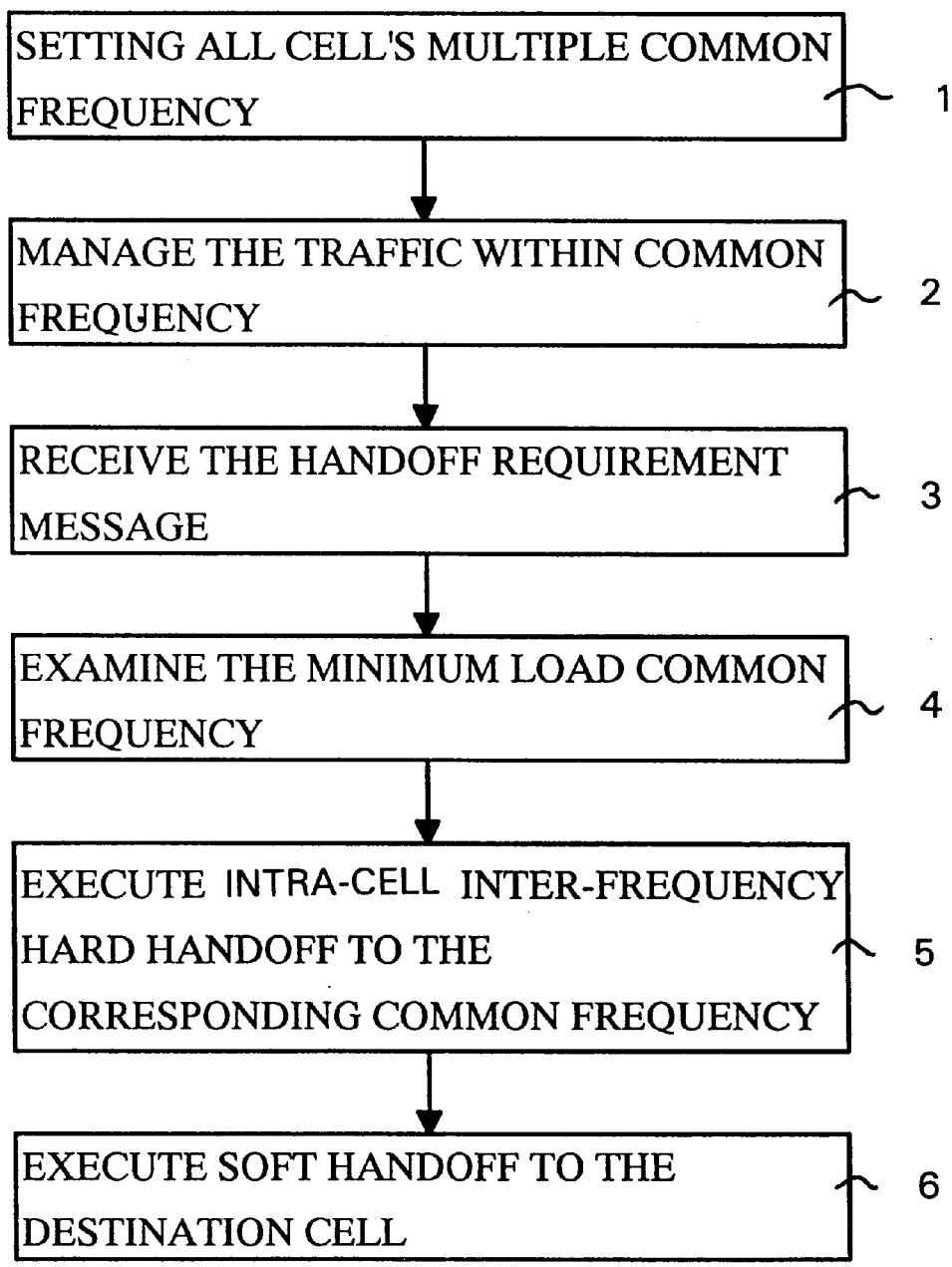
FIG. 3 is a flow/block diagram showing steps for an inter-cell inter-frequency handoff method and system in accordance with the present invention.

Referring to FIG. 3, a semi-soft handoff method, using multiple common frequency, includes step 1 for detecting multiple frequencies that all cells have commonly and designates the detected multiple frequencies as all cells' common frequency. Step 2 manages the traffic within said common frequency. Step 3 receives the handoff requirement message from the mobile station. Step 4 examines all adjacent cells' frequency assignment conditions and determines the common frequency with the minimum load. Step 5 executes inter-cell inter-frequency hard handoff to the determined common frequency, and step 6 executes a soft handoff to the destination cell by using the common frequency used in step 4.

It is preferable with respect to traffic load, to maintain the traffic load of the common frequencies within the cell where the handoff occurs. This invention selects the lowest frequency assignment number's value as the common frequency number by referring to its own cell's and adjacent cell's frequency assignment conditions.

Referring again to FIG. 2, in an illustrative example of the present invention, if cell #2, which has 3 FAs, obtains the lowest frequency assignment numbers among the adjacent cells, than FA1–FA3 may be designated as the common frequencies. The difference in adjacent inter-cell's frequency assignment is checked to ensure that not more than 2 frequency assignments are employed simultaneously. For example, when n numbers of frequencies are assigned to a cell, and n+1 numbers of frequencies are assigned to another cell, the common frequency can process a load of $n/(n+1)$ at a maximum.

Here, the paging channel is one of CDMA overhead channels added to process other commands while a mobile station is on or idle.

To maintain the multiple common frequencies traffic load uniformity, each frequency channel's traffic load must be managed while hard handoffing the new call to the frequency of the lowest load. Furthermore, to avoid new traffic from being assigned to the common frequency, the base station reassigns new traffic of the idle mobile station to a noncommon frequency. The idle mobile station is reassigned to a paging channel in the noncommon frequency, or when the idle mobile station tries to form a traffic channel, the traffic is assigned to the noncommon frequency. Then, when the traffic channel for the idle mobile station in the common frequency is set, it is set is to the noncommon frequency, not to the common frequency.

As an additional safety measure, the ability to handoff the common frequency's traffic to the noncommon frequency is added in case the common frequency's load is exceeded. This addition solves common frequency overload problems.

The system in accordance with the invention manages, initially, the condition of all adjacent cells' frequency assignments and sets all cells' common frequency to the frequency of lowest number of assignments.

By evaluating whether the present mobile station is idle in the common frequency, the base station may either reassign the mobile station to a paging channel in the noncommon frequency or, when setting the traffic channel, assign the traffic to the traffic channel in the noncommon frequency.

Furthermore, it is evaluated whether all common frequency loads are exceeded and, if the loads are exceeded, the traffic in the common frequency is handed off to the noncommon frequency.

Through the above processes, when receiving a handoff request message, a base station determines whether or not the traffic of the common frequencies is smooth, and determines the common frequency with the lowest load. After the common frequency with the lowest load is determined, traffic is assigned to this common frequency through the inter-frequency hard handoff in the cell. Next, by executing the soft handoff to the destination cell using the common frequency, the inter-cell inter-frequency handoff is completed. Advantageously, the present invention needs no additional hardware, the algorithm is simple and reliability is high.

An overload danger of a specific frequency range is reduced considerably by maintaining multiple common frequencies. Even inappropriate judgments or in unavoidable cases, when setting the call, the problem of traffic concentration to the common frequency is prevented through traffic channel designation, and the distribution of the traffic in the overload frequency bandwidth to another frequency is performed.

Having described preferred embodiments for a novel a semi-soft handoff method that uses multiple common frequency (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A semi-soft handoff method using multiple common frequencies wherein a base station makes use of a multiple frequency channel, said method comprising the steps of:

designating frequencies among a plurality of cells, by the base station, as common frequencies;

managing traffic, by the base station, within the common frequencies;

receiving, by the base station, a handoff requirement message;

determining, by the base station, a lowest load common frequency among the plurality of cells;

executing inter-cell inter-frequency hard hand-off to the lowest load common frequency; and executing a soft handoff to the destination cell by using the lowest load common frequency.

2. The semi-soft handoff method as recited in claim 1, wherein said base station individually uses multiple common frequencies to execute inter-cell inter-frequency hand-offs.

3. The semi-soft handoff method using multiple common frequency as recited in claim 1, wherein the step of executing inter-cell inter-frequency hard hand-off includes the step of determining inter-frequency handoffs based on power of a pilot signal receiving a present service.

4. The semi-soft handoff method as recited in claim 1, wherein said selected multiple common frequency selected by examining adjacent cells' frequency assignment conditions is a frequency associated with a lowest assignment number among the cells.

5. The semi-soft handoff method as recited in claim 1, wherein the step of managing traffic includes the step of forcing a hard handoff to another frequency when the common frequency overloads, a call on the common frequency channel in which the overload occurred being distributed to a relatively low load frequency channel.

6. The semi-soft handoff method as recited in claim 1, further comprises the steps of:

reassigning an idle mobile station in the common frequency to a paging channel with the idle state in a noncommon frequency band; and preventing new traffic from being assigned to the common frequency.

7. The semi-soft handoff method as recited in claim 1, further comprises the step of assigning new traffic to a noncommon traffic channel when an idle mobile station's traffic channel is formed to the common frequency.

8. The semi-soft handoff method as recited in claim 1, wherein each multiple common frequency has a traffic load and further comprising the step of managing traffic loads to make the traffic loads substantially uniform.

9. The semi-soft handoff method as recited in claim 1, further comprises the step of setting a new call from multiple common frequency channels, by setting the channel to the frequency channel with the lowest traffic load, each frequency channel's traffic load being managed.

10. The semi-soft handoff method as recited in claim 1, further comprising the step of setting a new call by assigning a traffic channel to a frequency other than a corresponding mobile station's frequency band.

11. The semi-soft handoff method as recited in claim 1, further comprising the step of setting a call to another frequency by designating a corresponding frequency to a CDMA frequency's contents based on contents of CDMA assigning messages from paging channels.

12. A method of handing off calls from a mobile station between base stations comprising the steps of:

designating frequencies among a plurality of cells, by at least one base station, as common frequencies;

selecting, by the at least one base station, a common frequency with a lowest load among the multiple common frequencies; and handing off a call using the selected common frequency.

13. The method of handing off calls as recited in claim 12, wherein the step of designating frequencies includes the step of determining inter-cell inter-frequency handoffs based on power of a pilot signal receiving a present service.

14. The method of handing off calls as recited in claim 12, wherein each multiple common frequency has a traffic load and further comprising the step of managing traffic loads to make the traffic loads substantially uniform.

15. The method of handing off calls as recited in claim 12, further comprising the steps of forcing a hard handoff to another frequency when the selected common frequency overloads, a call on the common frequency channel in which the overload occurred being distributed to a relatively low load frequency channel.

16. The method of handing off calls as recited in claim 12, further comprises the steps of:

reassigning an idle mobile station in the selected common frequency to a paging channel with the idle state in a noncommon frequency band; and preventing new traffic from being assigned to the common frequencies.

17. The method of handing off calls as recited in claim 12, further comprises the step of assigning new traffic to a noncommon traffic channel when an idle mobile station's traffic channel is formed to the common frequencies.

18. The method of handing off calls as recited in claim 12, wherein the step of handing off a call using the selected common frequency includes the step of executing an intra-cell inter-frequency hard hand-off to a lowest load common frequency.

19. The method of handing off calls as recited in claim 12, wherein the step of handing off a call using the selected common frequency includes the step of executing a soft handoff to a destination cell by using a lowest load common frequency.

20. A system for handing off calls from a mobile station between base station comprising:

means for setting cells to a common frequency selected from multiple predetermined common frequencies designated by at least one base station;

means for selecting, by the at least one base station, the common frequency for the cells based on a frequency channel having the lowest use; and means for handing off a call between the base stations on the selected common frequency.

21. The system as recited in claim 20, wherein the means for handing off further comprises a noncommon traffic channel for reassigning traffic when an idle mobile station's traffic channel is formed to the selected common frequency.

22. The system as recited in claim 20, wherein the means for handing off further comprises an inter-cell inter-frequency hard hand-off means for executing a handoff to a lowest load common frequency.

23. The system as recited in claim 20, wherein the means for handing off further comprises a soft handoff means for executing a handoff to a destination cell by using a lowest load common frequency.

* * * * *